March 7, 1939.  A. B. WHITE  2,149,325
AUTO-DIAGRAPH FOR BALL GAMES
Filed May 8, 1937   10 Sheets-Sheet 1

Inventor
Anthony B. White,
By Carl A. Hellmann,
Attorney

March 7, 1939.  A. B. WHITE  2,149,325
AUTO-DIAGRAPH FOR BALL GAMES
Filed May 8, 1937  10 Sheets-Sheet 2

Inventor
Anthony B. White,
By Carl A. Hellmann,
Attorney

March 7, 1939.　　　A. B. WHITE　　　2,149,325
AUTO-DIAGRAPH FOR BALL GAMES
Filed May 8, 1937　　10 Sheets-Sheet 4

Single Unit, each lens focused on same spot

Inventor
Anthony B. White,
By Carl A. Hellmann,
Attorney

March 7, 1939. A. B. WHITE 2,149,325
AUTO-DIAGRAPH FOR BALL GAMES
Filed May 8, 1937 10 Sheets-Sheet 5

Fig. 9.

Inventor
Anthony B. White,
By Carl A. Hellmann,
Attorney

March 7, 1939. A. B. WHITE 2,149,325
AUTO-DIAGRAPH FOR BALL GAMES
Filed May 8, 1937 10 Sheets-Sheet 7

Inventor
Anthony B. White,
By Carl A. Hellmann,
Attorney

March 7, 1939.   A. B. WHITE   2,149,325
AUTO-DIAGRAPH FOR BALL GAMES
Filed May 8, 1937    10 Sheets-Sheet 8

Inventor
Anthony B. White,
By Carl A. Hellmann,
Attorney

March 7, 1939.  A. B. WHITE  2,149,325
AUTO-DIAGRAPH FOR BALL GAMES
Filed May 8, 1937   10 Sheets-Sheet 9

Inventor
Anthony B. White,
By Carl A. Hellmann,
Attorney

Patented Mar. 7, 1939

2,149,325

UNITED STATES PATENT OFFICE 2,149,325

AUTO-DIAGRAPH FOR BALL GAMES

Anthony B. White, Hot Springs, Ark., assignor of fifty per cent to Homer K. Wright, Hot Springs National Park, Ark.

Application May 8, 1937, Serial No. 141,529

18 Claims. (Cl. 35—29)

The present invention relates to a device intended primarily for use in athletic instruction.

More specifically the invention relates to a device which, by means of light rays, indicates various plays which are to take place, or have taken place, in games such, for example, as football or other ball games, wherein the movements and locations of the players and of the ball are to be indicated.

Still more specifically the device comprises a "board" or other surface with which cooperates a number of illuminating devices each of which has a control means associated therewith whereby the presence or absence of illumination as well as the color of illumination at the corresponding portion of the board may be controlled.

The primary purpose for which the device is intended is to assist coaches in teaching the game of football to students, particularly members or prospective members of football teams.

The device may also be used to show to an audience any ball game, complete play-by-play, practically as soon as it can be received by telegraph or telephone or other means from the actual playing field. It is capable of illustrating the players of both teams and their various movements, so as to give a good idea of the approximate speeds of the individual players.

The members of the different teams are distinguished on the board by different colors, that is, each team will have its own color, and the ball itself will be shown by still another color, so that the audience can follow each individual player, as well as the ball, in both offensive and defensive plays.

The plays appear in somewhat diagrammatic form upon a board or screen made of ground glass or equivalent translucid or translucent material, the diagram being complete when the carrier of the ball is finally stopped. It will then gather the players in their correct formation for their next succeeding play, etc., and the progress and position of the ball may be indicated substantially to correspond with the actual movements and position thereof on the playing field.

In teaching the game, the device may be used to show blocking, tackling and the correct and incorrect ways to carry out various plays. The device may be stopped at any point in a play and the indications will then remain there, showing an incomplete diagram, which will enable coaches to point out errors or some particular features of plays which are to be studied.

It may be used equally well to show either games being played immediately adjacent thereto or those at distant points and thus serves the purpose of an electric scoreboard for fans, as well as the purpose of instruction for athletic students.

Because of the numerous indicating elements provided in the device and the ease of manipulating the same, the apparatus is capable of bringing out practically every detail of the play and thereby provides for an increase of interest in the game in general.

While the above objects have been stated on the assumption that the device is useful mainly for the game of football it will, of course, be obvious that without modification, or with only slight modifications in certain cases, the apparatus may be used for practically any type of ball game played by individuals or teams.

It will be obvious that the apparatus may assume many different forms, but for the purpose of illustration there is disclosed herein one preferred embodiment of the mechanism which has been found particularly advantageous. This is described in the present specification and illustrated in the accompanying drawings wherein.

To facilitate an understanding of the device and its operation it will be well first to give a general explanation of the apparatus.

Figure 5:
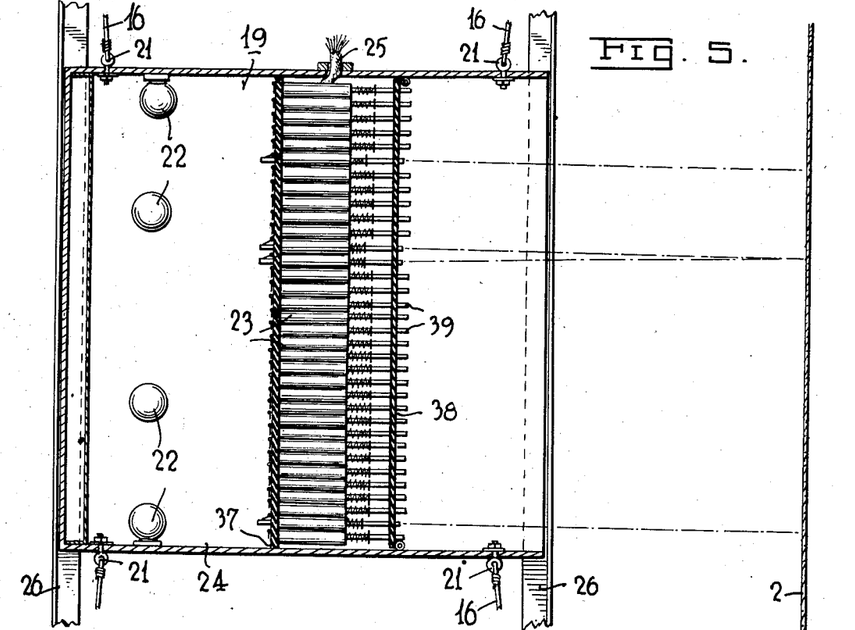
Fig. 5 is a still further enlarged fragmentary section of the light controlling mechanism, on the plane indicated by the line 5—5 of Fig. 3.
Figures 6, 7, 8:
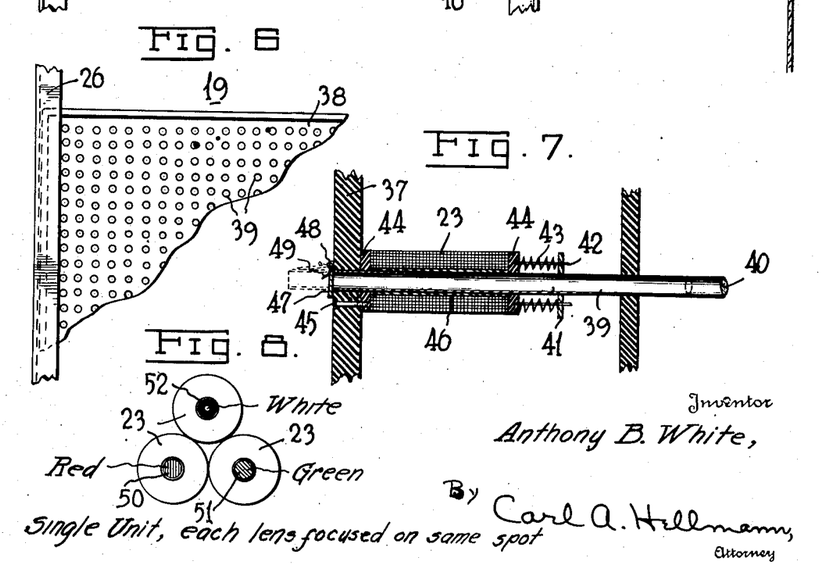
Fig. 6 is a detail elevation of the front of the solenoid box, partly broken away.
Fig. 7 is a detail sectional view of a light controlling solenoid or magnet with cooperating parts.
Fig. 8 is a diagrammatic representation of three solenoids or magnets in end view.

Referring first to Fig. 5 it will be noted that a series of solenoids or magnets is provided, one of which is shown in detail in Fig. 7, each solenoid or magnet having a tubular plunger with a lens and a color screen therein, a hinged shutter closing one end of said tubular plunger unless the solenoid or magnet is energized to draw in its tubular plunger whereupon the hinged shutter opens and thereupon light may pass either from one of the lamp bulbs shown in Fig. 5 or from the reflector in back of said lights, through the tube in question. This produces a spot of light on the board or translucent screen whose color is determined by that of the color screen in the respective tube.

These solenoids or magnets are arranged in groups of three, as shown in Fig. 8, where the colors transmitted by the tubes are white, red, and green, respectively, as indicated. This set of three solenoids or magnets has its three lenses all focused on the same spot of the screen so that no matter which solenoid of the set is energized the resulting illumination on the screen will always be centered at the same spot for any one of the three.

The red and green spots of light are relatively large, for example, they may be an inch and a half in diameter while the white spot is relatively small, say ⅜th inch or ½ inch in diameter. The white light indicates the ball while the red and green lights indicate the players on the respective teams. The white light will be superimposed on either the red or the green and inasmuch as white light will overcome any colored light of comparable intensity, this white light will clearly be visible at the center of either the red or green image on the screen and when so visible indicates that the player represented by the red or green image is at the time in possession of the ball.

The light which passes through the solenoid tubes as a rule comes not directly from the lamps but rather through reflection from the reflecting back and sides of the compartment and thus the four lamps indicated in Fig. 5 will suffice for the large number of solenoid or magnet tubes. These lamps it will be understood are preferably of high candle power so as to produce images of adequate brightness upon the board or screen.

Figure 3:
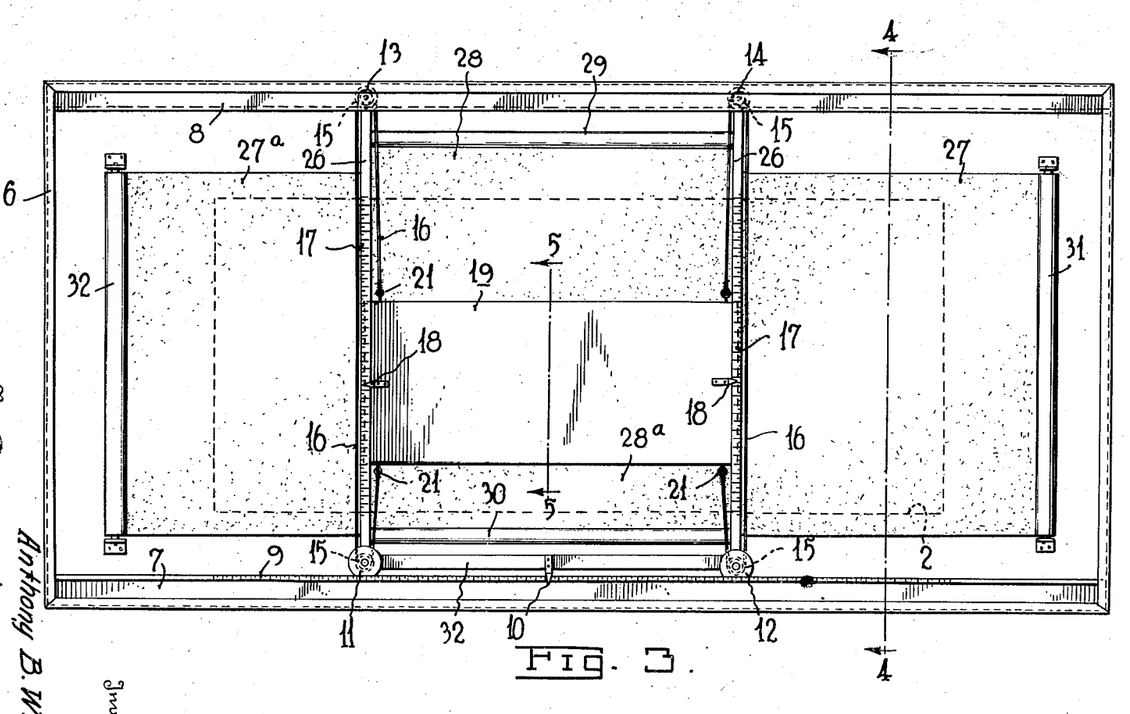
Fig. 3 is a rear elevation corresponding to Fig. 1 and showing the light controlling mechanism.

The structure shown in Fig. 5, namely, the solenoid or magnet box, and which is shown also in Fig. 3, may be moved either vertically or horizontally or both, so as to bring the solenoid or magnet box opposite the desired portion of the translucent screen so that the players and plays will be indicated on the correct portion of said screen. By providing a relatively small shiftable solenoid or magnet box of this kind it is obvious that great economy of materials and expense is attained, since it would require a relatively large number of solenoids or magnets to completely fill the entire area of the screen and this would ordinarily be unnecessary since the plays which take place are usually concentrated within a relatively small portion of the playing field at any one time.

Figure 4:
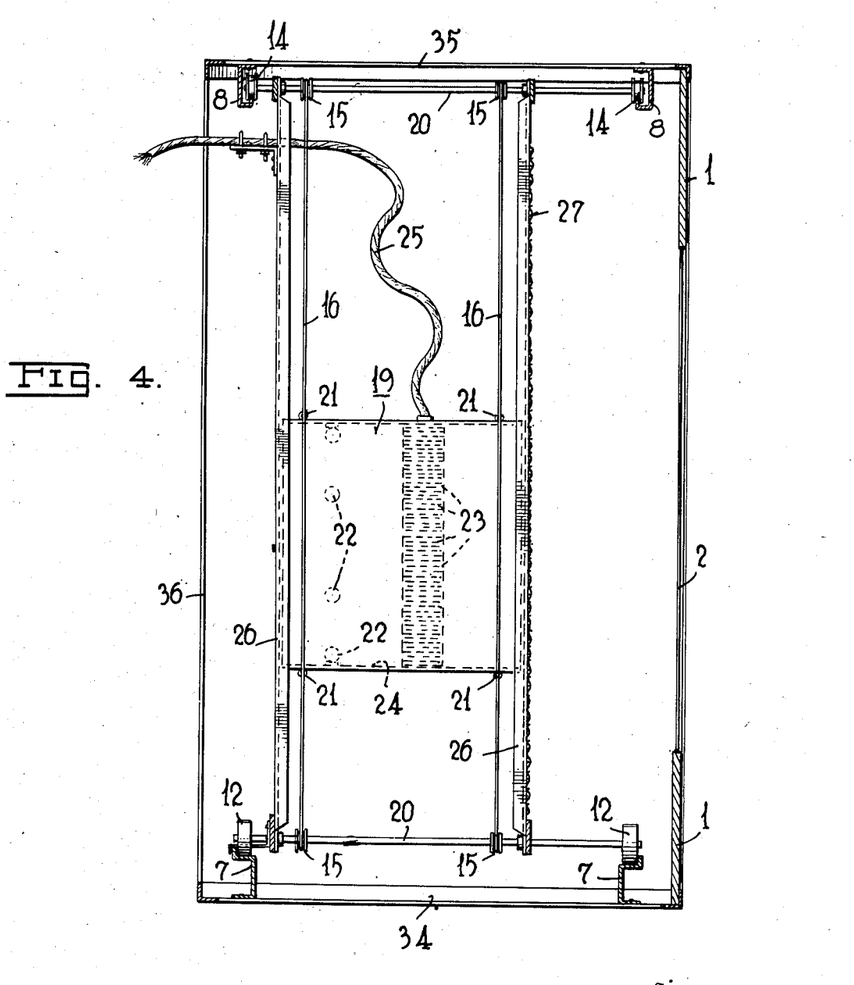
Fig. 4 is a vertical section, on a larger scale, through the structure shown in Fig. 3, on the plane indicated by the line 4—4.

It will be seen from Fig. 4 that a cable leads to the solenoid or magnet box, this cable comprising sufficient conductors to energize adequately all the solenoids or magnets which are necessary to indicate any given arrangement of the players and ball, together with their movements.

Figure 9:
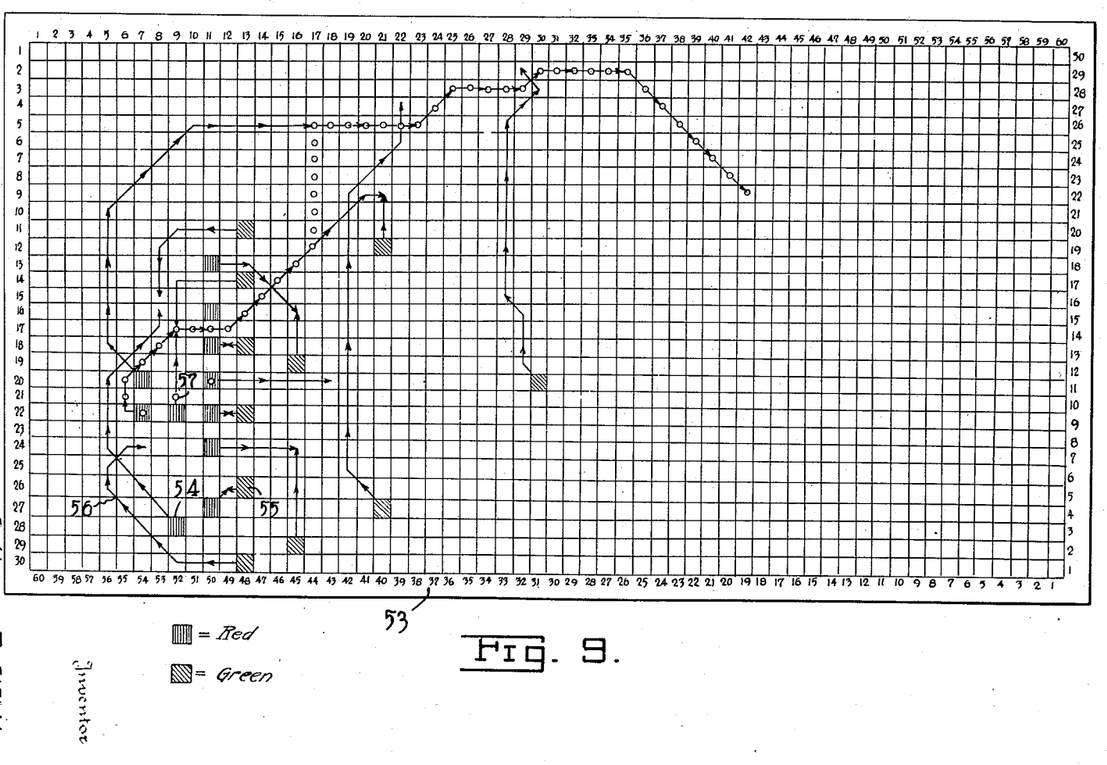
Fig. 9 is a representation of a chart, to guide the operation to set up the apparatus to illustrate one play to be shown by the apparatus.

In order to energize the proper solenoids or magnets to indicate a given play, a chart such as is shown diagrammatically in Fig. 9 must be prepared in advance for each play to be studied. On this chart there are indicated, in the respective colors red and green, the players of the opposing teams and the white circles indicate the successive positions of the ball. With the aid of such chart the attendant can then set up the proper connections to the solenoid cable in advance so that when the coach is ready to explain the play to his students, it will be necessary merely to operate the rotary switch, shown in Figs. 18, 19 and 20, step by step, which has the result of progressively displaying the images representing the movements of the players and ball upon the screen, said images remaining on the screen as long as the switch is kept in the desired position.

Figure 18:
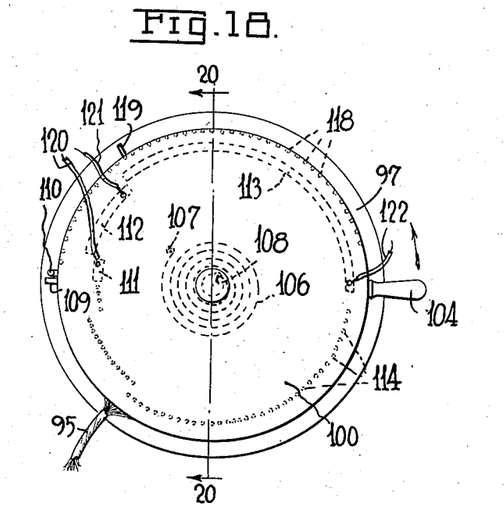
Fig. 18 is a top view of a rotary switch to be used in controlling the operation of the solenoids, or magnets.

By moving the switch continuously through a half revolution in the direction shown by the arrow in Fig. 18, the play will then take place in correct sequence and upon stopping the movement of the switch at any desired point, any interesting arrangement of the players and ball may be left on exhibition on the screen while the coach discusses it, whereupon he may then proceed to turn the switch further to complete the play.

Figures 10, 11, 12:
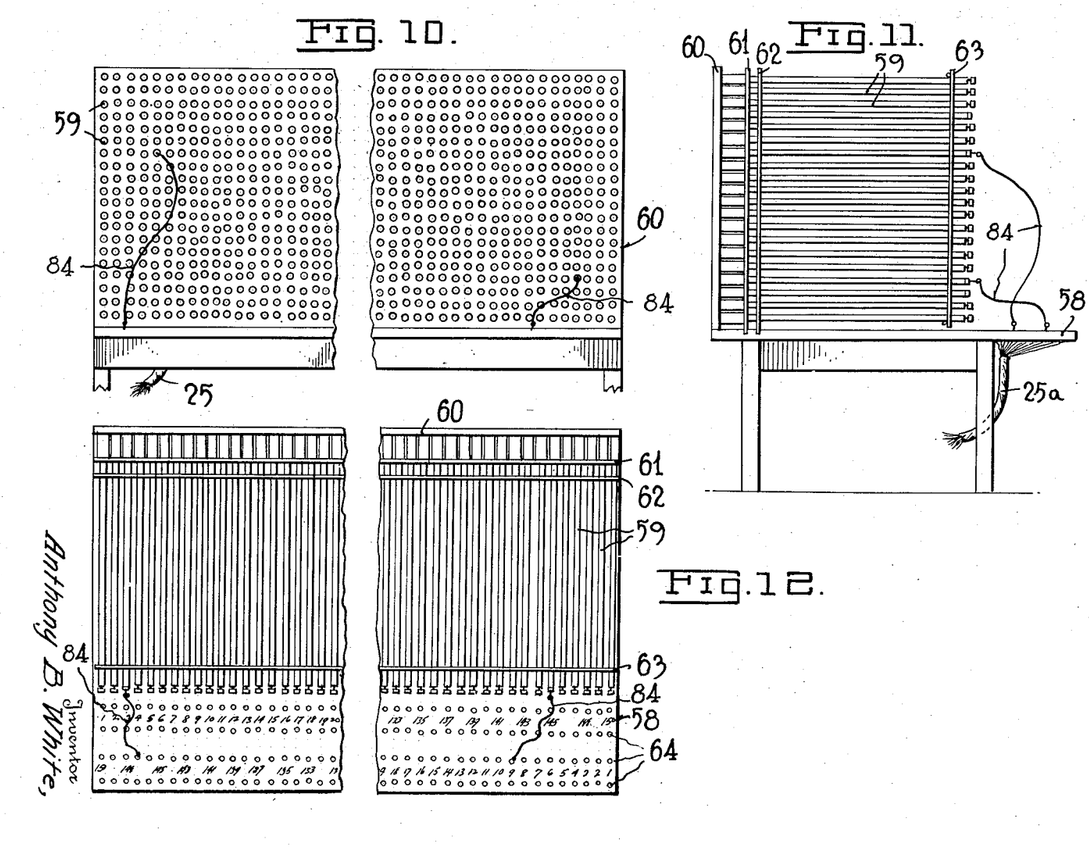
Figs. 10, 11 and 12 show the electrical switchboard in front, side and top view respectively, partly broken away.
Figure 13:
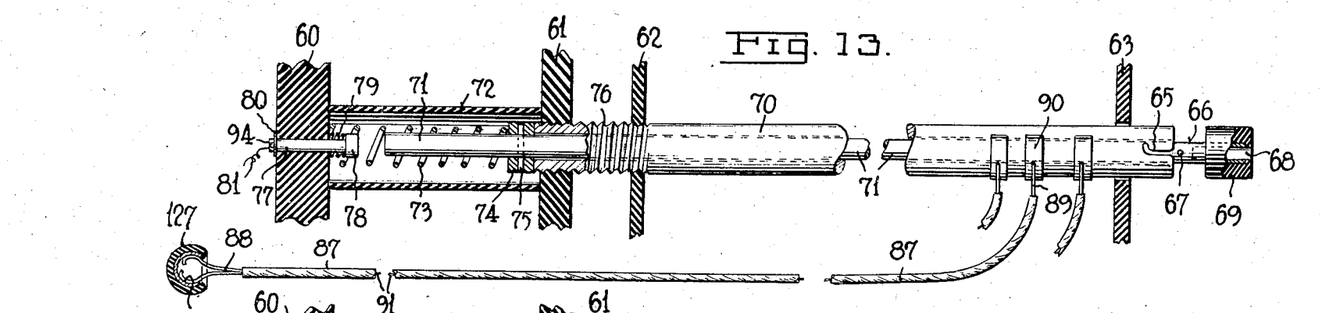
Fig. 13 is a detail of one of the electrical connecting devices of the switchboard in inactive position.
Figures 14, 15, 16, 17:
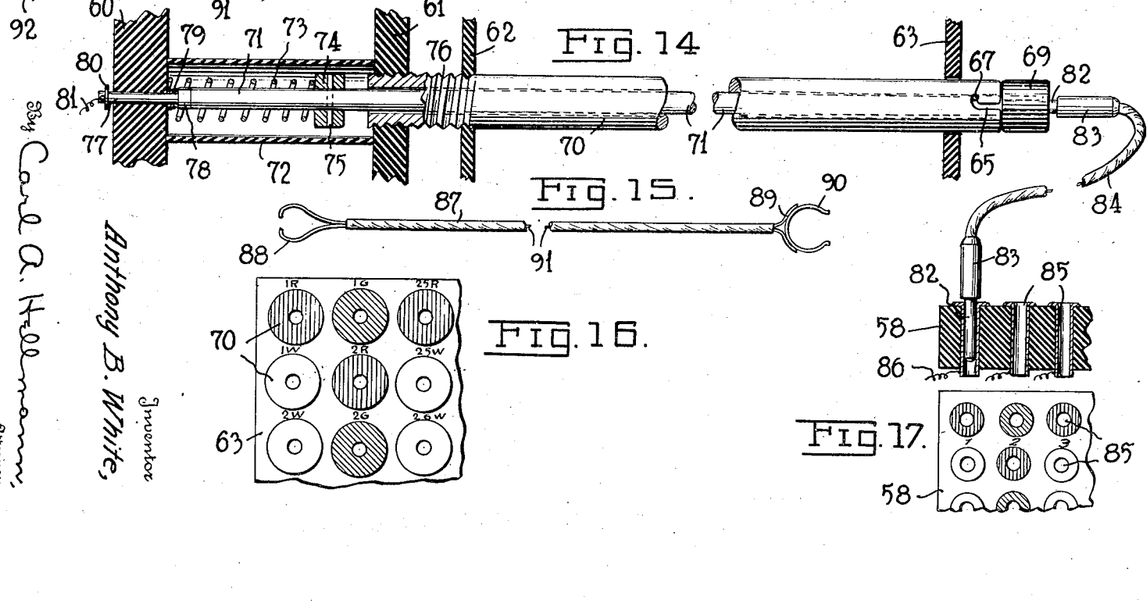
Fig. 14 shows the same actively connected by an emergency spiral flexible connector to another portion of the switchboard.
Fig. 15 is the normally used flexible connector having clips at its ends.
Figs. 16 and 17 are enlarged detail views of fragmentary portions of the switchboard, to show the identifying markings thereon which correspond with each other.
Figure 20:
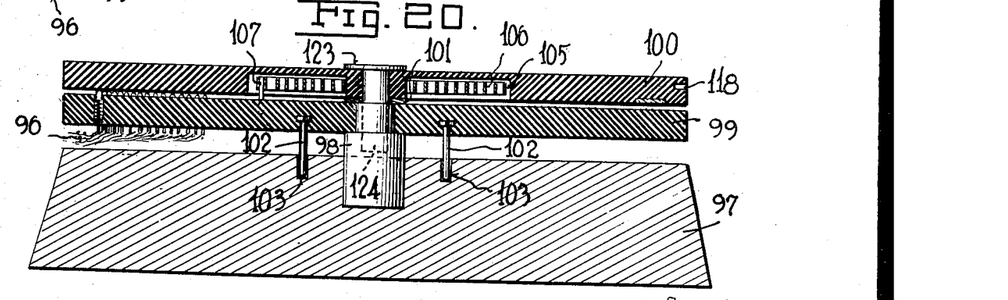
Fig. 20 is a vertical section of said switch on the plane represented by the line 20—20 of Fig. 18.
Figure 21:
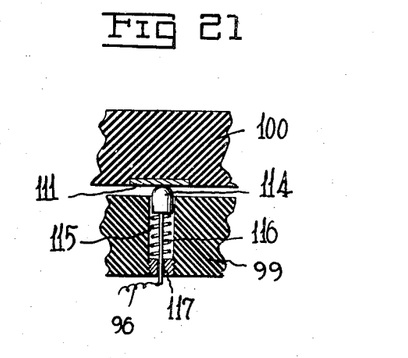
Fig. 21 is a detail sectional view of slidable contact means, embodied in said switch.
Figure 22:
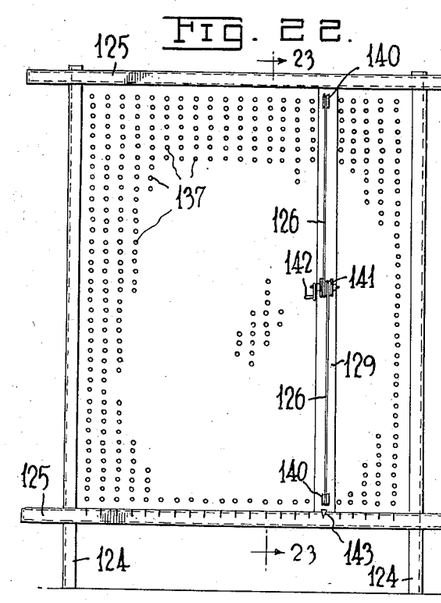
Fig. 22 is an elevation of a switchboard.
Figure 23:
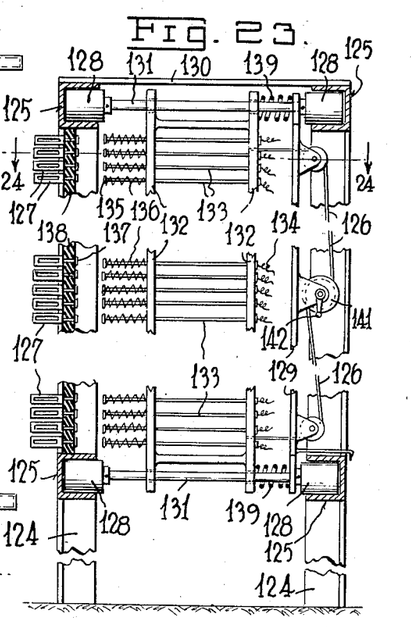
Fig. 23 is an enlarged section of the device shown in Fig. 22 on the plane indicated by the line 23—23, partly broken away.
Figure 24:
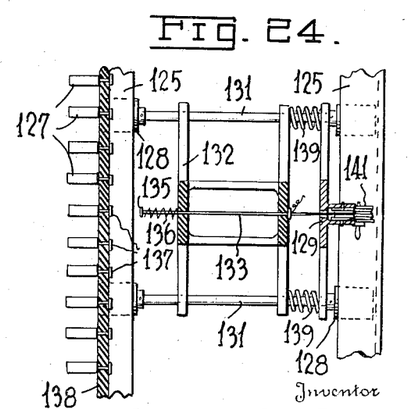
Fig. 24 is an enlarged fragmentary horizontal section of structure shown in Fig. 22 on the plane indicated by the line 24—24 of Fig. 23.

In order to predetermine which solenoids or magnets are to be energized, the connections are made to the cable by means of the switchboard shown in Figs. 10, 11, and 12, operating through the switchboard shown in Figs. 22, 23 and 24, and then to the rotary switch as shown in Figs. 18, 19, 20 and 21. These connections may be made by means of the flexible conductors having clips as shown in Fig. 15, one end of each of which may be snapped on the outside of the tube as shown in Fig. 13, while the other end engages within a socket of the switchboard as shown in Figs. 22, 23, and 24. The sliding contact member as shown in Fig. 22, makes contact with the rotary switch as shown clearly by the wiring diagram, Fig. 25.

It is readily seen that if the connections are lined up from the tubes to a line of contact pins on the switchboard shown in Fig. 22, and connected through the sliding contact member to the rotary switch, then merely by grasping the handle of the rotary switch and pulling it as far as it will go, the proper solenoids or magnets will be energized and the play will materialize on the screen. Connections for all plays that are to appear on screen must be made to the tubes beforehand in the manner just described. However, after a coach has decided what particular plays are to be discussed in the day's demonstration or lesson, he sometimes decides to change the diagram of a play.

If this change of purpose occurs after the connections have already been made, the attendant will have to change the tube connections at the play-selecting switchboard and inasmuch as the time available for such change may be relatively short, such change is facilitated by merely grasping the fibre cap at the end of each of the tubes as shown in Fig. 14, and making a half turn so that the cap now assumes the position shown in Fig. 13. This will disconnect the solenoids or magnets in the play that the coach does not want energized. Thereupon new connections to the tubes he wishes to energize can be made rapidly by the alternative flexible connectors of the type shown in Fig. 14, for example.

These flexible connectors instead of terminating in U-shaped clips at one end, terminate in ordinary cylindrical plugs which may be inserted into the ends of the tubes and also into sockets in the front of the table leading directly to the rotary switch and numbered accordingly. It is obvious that either connector will suffice to provide the same connection in an electrical sense, but that the second, or Fig. 14 type, is provided as a sort of emergency service to take care of sudden changes in the plays to be shown. This emergency connection is very desirable in showing play-by-play games.

Figure 25:
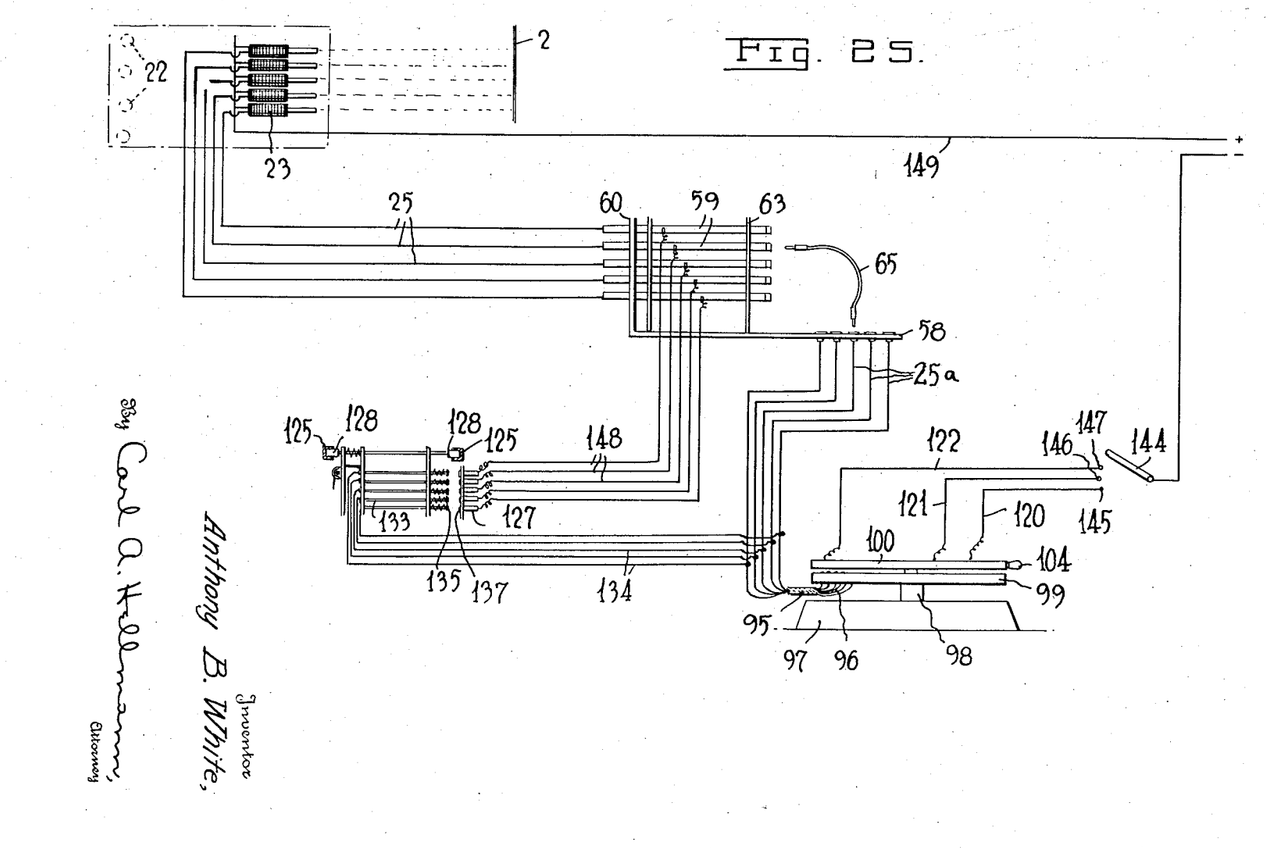
Fig. 25 is a diagram showing the electrical connections of the device.

Referring to Fig. 25 it will be seen that the circuit proceeds from the source of electrical power through the solenoids and switchboard tubes and thence through one or other of the sets of flexible connectors to the contacts on the rotary switch and back to the power supply line.

The structure of the apparatus will now be described in detail.

Figures 1, 2:
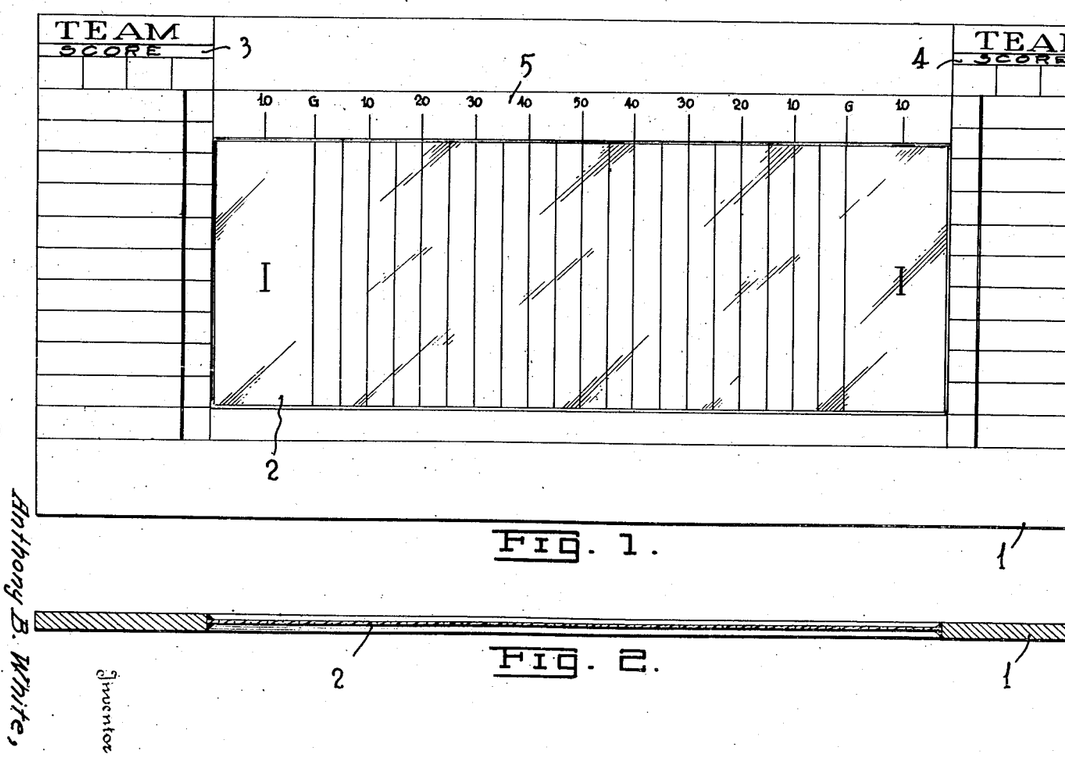
Fig. 1 is a front elevation of the board or screen upon which the plays are exhibited.
Fig. 2 is a section through said board on the plane indicated by the line 2—2 of Fig. 1.

Referring first to Figs. 1 and 2 reference character 1 denotes a frame or box having an opening therein, which is closed by a sheet of translucid material 2 such, for example, as ground glass or similar material. The front of this box may have any desired lines thereon to serve to receive written scores, as is customary in scoreboards, for example, blackboard surfaces or the like, as shown in 3 and 4, and in the present instance headed "Team" and "Score". Above the translucid portion there is a scale 5 in the present instance denoting distances in yards measured from the goal line G at each side, the figures indicating the respective yards.

Passing now to Fig. 3 which represents a rear view of said box, the outer framework thereof is indicated by reference character 6 and this framework may be made of any suitable material, for example angle irons or similar metallic shapes. The opening which contains the translucid screen 2 with the yard lines marked thereon, is here shown in dotted lines as it is concealed by the opaque screens 27, 27a, 28 and 28a. The screen 27 is wound on a spring roller 31, of the same nature as ordinary shade rollers, and opaque screens 27a, 28, 28a in like manner wind respectively upon the spring rollers 32, 29 and 30. These opaque screens have their ends attached to the vertical rails 26 and to the top and bottom of the box 19, thus preventing any extraneous light from striking the screen 2 from the rear. The only remaining portion of the screen 2 which may receive light is, therefore, that just in front of the box 19.

This box 19 is mounted for vertical and horizontal movement, the horizontal movement being provided by means of the rollers 15 cooperating with the lower track 7 and with the upper track 8 respectively, said rollers being carried at the upper and lower ends of the frame 26 as shown. The lower rail 7 is preferably provided with a scale 9 with which may cooperate a pointer or other indicator 10 carried by the horizontal member 33 attached to the frame 26. When the box 19 slides horizontally this pointer 10 will serve to indicate its position with respect to the screen 2 and the opaque screens 27 and 27a will automatically follow its horizontal movements so as to mask the unused parts of the screen 2.

As stated, the box 19 is also capable of vertical adjustment sliding, for this purpose, in the frame 26, as may be understood clearly from Figs. 3, 4 and 5. Belts 16 are attached to the top and bottom of the box 19 by screw eyes 21, as shown, there being four such belts which run over the pulleys 15 and which may be suitably tensioned to give sufficient friction to hold the box 19 in any position in which it may be placed. Indicators or pointers 18 attached to the rear of the box 19 may be used to cooperate with scales 17 on the two rear members of the frame 26 to indicate the vertical position of the said box.

All the pulleys or guide wheels 11, 12, 13, 14, and 15, may be conveniently mounted upon the same set of shafts 20, best shown in Fig. 4. It is obvious that the structure so far described will permit the box 19 to be shifted vertically, as well as horizontally, so as to cooperate with any desired portion of the screen 2, while the unused portions of said screen are protected against receiving any light from the rear by means of the opaque screens wound on the respective shade rollers.

Referring now to Figs. 4, 5, 6, 7, and 8, the details of the structure will be understood more clearly, since these figures are drawn on larger scales. The box 19 contains a group of lamps 22 preferably of considerable candle power and the inner surface 24 of said box may advantageously be painted white or aluminum, so as to reflect the maximum amount of light from said lamps 22 upon the rear of the bank of solenoids or magnets 23, 23, etc., indicated diagrammatically in Fig. 4 and in greater detail in the remaining figures. These solenoids, or magnets, as well as the lamps, are supplied with current through a suitable flexible cable 25.

A description is given here of a solenoid and also of a magnet each being very nearly like the other in construction, so that a single diagram illustrates either, the only difference being in the materials used; either may be used to operate the shutters. A solenoid 23 consists of a winding upon a tube 46 of non-magnetic material having flanges or ends 44 to support said winding. Each solenoid has guide pins 42 of non-magnetic material in its front flange 44, springs 43 of non-magnetic material being arranged around said pins and bearing against a plate 41 secured to a tubular plunger 39 made at least in part of magnetic material, which slides freely within the solenoid.

A magnet 23 consists of a winding upon a tube 46 of magnetic material having flanges or ends 44 of magnetic material to support said winding. Each magnet has guide pins 42 of non-magnetic material in its front flange 44, springs 43 of non-magnetic material being arranged around said pins and bearing against a plate 41 of magnetic material secured to a tubular plunger 39 of non-magnetic material which slides freely within the magnet. Each solenoid or magnet is secured by means of a screw or similar fastening 45 to a partition 37 mounted in the box 19.

Each tube 39 carries at its forward end a lens 40 which may either be made of red, green or clear glass or have a suitable color screen cooperating therewith to determine the color of light transmitted by said lens or there may be merely a properly located diaphragm 52 (Figure 8) arranged in the tube 39 in case white light is to be transmitted, this diaphragm having an opening of suitable size to produce a relatively small image on the screen 2.

The tubes 39 slide freely through another partition 38, also mounted in the box 19. At the rear of each tubular plunger and mounted upon the partition 37, is a flap or shutter 47 mounted pivotally at 48 and urged into closing position by gravity assisted by a relatively weak spring 49, so that when the tube 39 is in the position shown in full lines in Fig. 7 the shutter 47 is closed, while in the retracted position, when the plunger 39 is drawn into the solenoid or magnet 23 upon energization of such solenoid or magnet, the parts will assume the dotted position wherein the tube 39 opens the shutter 47, so as to allow light to pass from the rear portion of the box 19 through the respective tube 39 to form an image on the screen 2, said image corresponding in position and in color with the particular solenoid or magnet which is energized.

However, the solenoids or magnets are arranged in groups of three, as shown in Fig. 8, each group comprising one having a red lens, another a green lens and a third a diaphragm and an ordinary colorless lens and the three lenses of each such group being so arranged as to center their optical axes, and thus their respective images, upon one point of the screen, that is, energization of any solenoid or magnet of any one group will always illuminate the same spot on the screen for any given position of the box 19, while those of other groups will, of course, illuminate their own respective spots.

It is intended to energize at any time only one of the red or green solenoids or magnets in any particular group, but it is also intended, when necessary, to simultaneously energize the solenoid or magnet producing the white image, so as to produce a small spot of white light at the center of the green or red spot produced by the other energized solenoid or magnet. In Fig. 8 the red color screen or red lens is indicated at 50, the green one at 51 and the diaphragm for producing the white image is shown at 52.

While the color screens may be placed anywhere in the tube 39, the diaphragm 52 must, of course, be placed at a suitable position to provide a small image on the screen 2, that is, the diaphragm 52 and the screen 2 should be located at conjugate focal points of the lens 40. This is desirable also with the tubes producing the colored images, but is not indispensable.

Referring now to Fig. 9 it will be noted that in this diagram, which is one of a group the operator may have before him to indicate various plays, a chart 53 is made of a number of squares, each numbered at the top from left to right and downwards and at the bottom from right to left and upwards, so that the position of a square may be specified, starting from either the upper left or the lower right corner, by convenient numerals.

Each square represents one step or stage in the play and each square also corresponds to one group of three solenoids, such as shown in Fig. 8. Those squares provided with vertical cross-hatching, such as 54, for example, are to represent red illumination, while those cross-hatched with 45° lines, such as 55, represent green illumination and this chart means that the corresponding solenoids are to be arranged to give such color of light in the position on the screen 2, corresponding to this square.

In addition there are shown black lines 56 leading from these colored squares to various other positions, traversing certain squares on the chart in so doing. All these squares are to be successively illuminated with light of the same color as the respective screens at which they originate and this is accomplished by switching mechanism, which will be described in detail hereinafter.

The diagram also shows a number of circles 57 and these circles are to be illuminated by white light on the screen 2. In order to prevent this white light from entirely blotting out or overpowering the concurrent colored light it is necessary that the size of the white image be restricted and in practice it is found that if the colors are produced as images of, say, one and one-half inch diameter the white circles should preferably be not over one-half inch in diameter, so as to avoid difficulty and confusion in reading the image projected on the screen 2.

Attention is also directed to the fact that while the diagram on the chart 53 shows the colored images as squares, this is not necessary, as circles will be preferable in most cases for the shape of the final image on the screen 2, since circles are more readily produced; but for the purpose of the chart it is immaterial how the positions of the colors are indicated.

Referring now to Figs 10 to 17 inclusive there are shown the tubular contact members which are employed in making the connections to the various solenoids or magnets for producing the desired energizations thereof in accordance with the charts. These tubular contact members are preferably supported by a number of vertical panels of insulating material 60, 61, 62 and 63 carried by a table-like structure 58, as shown in Figs. 10, 11 and 12.

The wires from the cable 25, which leads to the solenoid or magnet box 19, terminate at pins 77 in the panel 60, as shown in Fig. 13.

Figs. 13, 14 and 15 show the details of each tubular contact member. In these figures, 70 is a tubular member of conducting material within which moves a rod 71. At one end the tube 70 is provided with a bayonet slot 65, said tube being adapted to receive a plug 66 having a pin 67 engaging in the slot 65. This plug has a suitable knob or handle 69 and has a bore or jack at one end, as shown at 82 in Fig. 14. The pin 67 carried by said plug engages in the bent portion of the bayonet slot 65. In this way a connection may be established between the wire 81 which leads to the solenoids or magnets and the wire 86 of Fig. 14 which leads to the rotary switch, for example, by inserting a flexible connector 84 having a plug 82 at each end thereof surrounded by an insulating collar 83, as shown, one of the plugs 82 being adapted to make contact in the bore or socket 68 of the plug 66 and the other plug 82 cooperating with one of the sockets 85 which is in turn connected with the conductor 86.

Electrical connection may thus be established between the wire 81 and the plug 66 by the mere act of inserting the plug 66 as far as it will go into the cap or knob 69 when said cap or knob is connected to the tube 70.

The rod 71 has a collar 74 secured thereto by any suitable means, such as a pin 75, for example, this collar bearing against the adjacent end of the tube 70. A spring 73 housed in a tubular member 72 and bearing on the one hand against the panel 60 and on the other hand against the collar 74 urges the rod 71 toward the right as shown in Fig. 13, but when the plug 66 is inserted until the pin 67 engages in the bent end portion of the slot 65 the rod 71 will be pushed thereby to the left, against the force of the spring 73, until its end makes contact with a cooperating contact element 78, carried by a rod 77 and urged to the right by the spring 79 bearing against the contact 78, on the one hand, and against the panel 60, on the other.

A suitable washer or flange 80 is secured to the outer end of the rod 77, as by a pin 94 or the like, a wire 81 being in contact with said rod, as shown. The contact 78 is thus yieldably supported, and when the rod 71 is pushed to the left, as far as possible, as shown in Fig. 14, this contact 78 will yield by compressing the spring 79 and thus a dependable yieldable electrical connection will be provided between the contact 78 and the rod 71.

In Figs. 10, 11 and 12 the various contact tubes have been indicated very diagrammatically, the purpose of these figures being mainly to show the general organization of the whole into what may be called a switchboard.

The way in which a contact may be established between any one of the tubes 70 and any other cooperating slot or electrical socket, such as 127, Fig. 13, for example, is by means of a special connector of the type illustrated in Fig. 15. This comprises a conductor 91 covered with insulating material 87 and having at one end a pair of curved resilient prongs 88 adapted to be compressed to enter itno a concave socket such as shown at 92, Fig. 13, and having at its other end a resilient metallic contact member 90 attached to the bifurcations 89. The member 90 is of proper size to spring readily over any one of the tubes 70 and remain held there by its own resilience.

Figure 19:
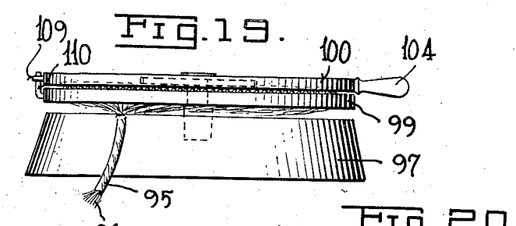
Fig. 19 is a side view of the switch of Fig. 18.

In order to control the supply of electricity to the various contact tubes 70 use is made of a special switch which is shown in Figs. 18, 19, 20 and 21. This switch comprises a base 97 carrying a pivot 98, said pivot 98 serving as a support for the disc 99 which is preferably made of insulating material and another somewhat similar disc 100 superimposed thereon, a suitable washer 101 being placed between the two discs, as shown in Fig. 20 to maintain them spaced from one another. The pivot 98 is preferably made with a detachable upper portion 123 fitted into a cavity 124 in the lower portion, as shown best in Fig. 20, so as to make it easy to take apart and reassemble the switch for cleaning and repairs when necessary. The disc 99 may be anchored against rotation by means of the pins or bolts 102 inserted into suitable apertures 103 in the base.

The top plate or disc 100 may be rotated by means of the handle 104 (Figs. 18 and 19). There is a cavity 105 in the disc 100 which serves to house a spiral spring 106. This spring 106 is secured at its outer end to a pin 107 which projects from the stationary disc 99 while the other end of the spring is secured to the movable disc 100 as shown at 108.

A suitable initial tension is given to the spring so that when the handle 104 is released the spring will carry the disc 100 into such position that a pin or projection 109 thereon will engage a stop 110 carried by the disc 99 as shown in Figs. 18 and 19. The handle 104 is thus free to move in a counterclockwise direction, as seen in Fig. 18, through approximately 180° whereupon the said handle will engage the stop 110. In so doing the switch will make a series of successive contacts as will now be described.

Referring to Fig. 21 it is seen that the movable plate 100 has secured thereto or embedded therein a series of flat arcuate contact members 111, 112 and 113, Figs. 18 and 21, which cooperate with spring-pressed contact members 114 arranged in the lower plate 99, these contact members being urged upwardly by the springs 115 so as to make good electrical contact with the arcuate plates 111, 112, and 113. It will be understood, of course, that while only three plates have been illustrated, in certain cases an entire semi-circular half of the lower surface of the disc 100 may be covered with such arcuate contacts arranged in concentric positions, so as to make it possible to provide the resilient contacts to cooperate therewith throughout practically the entire available semicircular portion of the lower plate 99 should such arrangement be desirable. Each of the contact members 114 has a stem 116 passing through and guided by a suitable preferably screw-threaded plug 117 and carries a wire or other conductor 96, all the wires 96 being conveniently assembled into a single cable as shown at 95.

It will be noted that the segment 111 has a wire 120 connected thereto, segment 112 likewise a wire 121, and segment 113 a wire 122. These wires are shown in Fig. 18 and also in the diagram of connections, Fig. 25, and serve to make connection between the supply mains and the series of contact members 114.

A series of holes 118 is preferably provided in the periphery of the disc 100 each of which is adapted to receive a pin 119, in order to stop the rotation of the disc 100 at any desired point at which said pin 119 is inserted into a hole 118.

Referring now to Figs. 22, 23, and 24, there is illustrated an auxiliary switchboard. It comprises a framework made of upright structural metal members, such, for example, as angle irons 124, and horizontal members, such as the channel bars 125, there being two such frames, one at the front and one at the rear, held spaced apart at the proper distance by cross members 130. In the channel bars 125 there run rollers 128 arranged as shown in Figs. 23 and 24 wherein eight rollers are used, two running in each channel member.

These rollers are mounted upon shafts 131 carried by the movable carriage 132, which may thus move horizontally to the right or left in Fig. 22. This carriage insulatingly carries a series of vertically alined contact members 133 each of which has a wire 134 electrically connected thereto at one end and carries at its other end a contact element 135, springs 136 bearing against the carriage 132, on the one hand, and against the contact element 135, on the other hand, so as to urge said contact elements toward the left in Figs. 23 and 24.

Contact elements 137 are mounted in the panel of insulating material 138 supported by the frames 124, 125 and terminate in terminals 127 on the other side of said panel. These contact elements 137 are properly spaced to cooperate with the contact elements 135 and are arranged in vertical columns, as shown in Fig. 22. Upon the shafts 131 of the carriage 132 are arranged springs 139 acting against the carriage 132, on the one hand, and against a vertical bar 129, on the other hand, so as to urge the carriage away from the said bar and thereby tend to bring the contact elements 135 into electrical connection with the corresponding opposed contact elements 137. The whole carriage, however, may be moved horizontally so as to bring its column of contact members 133 into alinement with any desired column of contact elements 137.

It will be noted that cords 126 are provided which pass over pulleys 140, arranged near the upper and lower ends of the bar 129, and have one end of each attached to the carriage 132 while the remaining ends are wound upon the reel 141 mounted upon the bar 129, so that by turning the handle 142 of said reel in such direction as to pay out the cords 126, the springs 139 will thereupon act to force the carriage 132 to the left, Figs. 23 and 24, and thereby cause the contact elements 135 to engage the corresponding contact elements 137 while on the contrary turning the handle 142 in the opposite direction will cause such contacts to be broken.

When the contacts are made, connection is thereby established between the terminals 127 and the corresponding wires 134 and when the rods 133 are withdrawn, then, by moving the whole carriage to the right, Figs. 23 and 24, the carriage may be shifted to any desired column of contact elements 137, and the position may be indicated by the pointer 143 cooperating with a suitable scale on the lower channel member 125, as shown in Fig. 22. This scale preferably has its graduations spaced apart a distance equal to the horizontal spacings of the columns of contact elements 137, so that when the pointer 143 is opposite any graduation on the scale the contact elements 135 will be in proper alinement with the corresponding column of contact elements 137.

Referring now to Fig. 25 it will be seen that the switch board just described is connected in alternative relationship with the switchboard comprising the tubes 59, that is, a circuit may be completed between the electric supply line marked, by way of example, minus (—) and the group of solenoids or magnets 23 by way of the switch 99, 100, the switch 144, one of the contacts 145, 146 and 147, the corresponding conductors 120, 121 and 122, and the conductors 96, constituting the cable 95, through the switchboard 58 and cords 65, on the one hand, or through wires 134 and the switchboard comprising the contact members 133, contact elements 135 and 137, through conductors 148 to the tubes 59, so that connection may be made between the wires 96, and the tubes 59 either through the wires 25a, and alternative switchboard 58 and cords 65 or through the main switchboard comprising wires 134 and contact rods 133 and wires 148, whichever switchboard is in use at the time, and thence to the positive (+) terminal through the wire 149.

The operation of the device will be understood to a great extent from its construction, as above disclosed, but for completeness may be summarized as follows:

Assuming, for example, that a certain football play is to be illustrated upon the screen 2, a chart, similar to the one shown at 53, Fig. 9, will first be selected or prepared on a suitable piece of paper or other material ruled into squares as shown. Since each square on the paper represents a one yard square on the actual playing field, the positions of the players of both teams will first be indicated thereon by coloring the corresponding squares red and green for the men of the two respective teams. Lines will then be drawn representing the course to be pursued by each player and another line will be drawn representing the path of the ball. This path is indicated by the circles and where the ball is in possession of a player the corresponding circle will appear on the line representing said player's path, whereas when the ball is thrown or otherwise conveyed from one player to another there will be no line connecting the circles showing the positions of the ball but these, on the contrary, will appear as shown in column 17 of the diagram, squares 6 to 11 from the top left hand corner.

With this chart before him the operator will then make suitable connections at the switchboard, shown in Figs. 10, 11, and 12. By snapping the clips 90 on the outsides of the tubes 70 and fastening the other end of each conductor 87 in slot 127 which in turn will make contact with the slidable contact plugs 136, these plugs lead through the wires 134 to the cable 95 and to the rotary switch. If, after a play has been pre-set in this manner, that is, by means of the conductors 87 and the tubes 70 through the switchboard as shown in Figs. 22, 23 and 24 to the rotary switch, a change in the play should occur, then by disconnecting the rods 71 from the contacts 78 of these solenoids or magnets which are not to be energized, and then using conductors 84 and placing one end of each plug 82 in a slot or jack 68 and the other end in a slot 85 leading to the rotary switch, it thereby becomes possible to energize any other solenoids or magnets as desired.

It will be noted that the slot 85, through the wire 86, leads to the cable 95. The same is true of the wire 134. The cable 95 in turn connects with the wires 96 leading to the lower fixed disc 99 of the switch, so that when the upper disc 100 is turned the segments thereon will make contact with certain of said wires 96 and thus establish connections through the switchboard to the solenoids or magnets and back to the plus (+) line.

The switch 144 is connected in the minus (—) line. With the connections thus established and the switch 144 set as desired on point 145, 146, or 147 the disc 100 on rotation will then cause certain of the solenoids or magnets 23 to be actuated, corresponding to the particular contact segment 111, 112 or 113, in use.

It will be noted that each of these segments will first engage the end contact 114 corresponding thereto and thereafter will engage successive contacts 114 until the entire segment makes connection therewith, the result being that the solenoids or magnets corresponding thereto will be actuated and after the first one is actuated the second will become actuated without disconnecting the first, and so on in succession until the entire group corresponding to the extent of the contact segment has been put in service.

The result of this will be that there will be illuminated on the screen 2 a continuous path, of red or green light depending upon which player is being illustrated, leading from the initial position of each player to his position at the instant in question, and simultaneously the possession of the ball will also be indicated in white light on the same screen, the white light being within a colored spot whenever a player has the ball in his possession, or, on the other hand, standing alone in a square, whenever the ball is being passed from one player to another and is not in the possession of any at the given time.

By turning the rotary switch disc 100 to any desired extent the progress of the indications may be stopped on the screen 2 and thus show what positions have been reached by the respective players and by the ball at any given instant of the game.

Having described the device and its operation it will be obvious that many modifications of various details thereof may be made without departing from the spirit of the invention and, therefore, the invention is to be considered as defined solely by the following claims:

1. An indicating device comprising a screen, a source of light, a shutter, a solenoid, and a tubular plunger for said solenoid for operating said shutter, whereby upon energization of the solenoid the plunger will move within said solenoid and open the shutter to permit light to pass to the screen through said plunger.

2. An indicating device comprising a screen, a source of light, a shutter, a solenod, a tubular plunger for said solenoid for operating said shutter, and a lens in said plunger arranged to focus light upon said screen whereby upon energization of the solenoid the plunger will move within said solenoid and open the shutter to permit light to pass to the screen through said lens.

3. An indicating device comprising a screen, a source of light, a set of three solenoids, a shutter for each, a tubular plunger for each solenoid for operating its shutter, and a lens in each plunger, all three lenses being arranged to focus light upon the same point of said screen, whereby upon energization of any of said solenoids the plunger will move within said solenoid and open its shutter to permit light to pass to the said focal point on the screen through said lens.

4. An indicating device comprising a screen, a source of light, a set of three solenoids, a shutter for each, a tubular plunger for each solenoid for operating its shutter, a lens in each plunger, and color screens in two of the plungers, all three lenses being arranged to focus light upon the said point of said screen whereby upon energization of any of said solenoids the plunger will move within said solenoid and open its shutter to permit white or correspondingly colored light to pass to the said focal point on the screen through said lens.

5. An indicating device comprising a screen, a source of light, electrically actuable means interposed between the source of light and the screen to control the passage of light from said light source to said screen, a source of electricity, conductors, a switch, and a switchboard controlled thereby for supplying electricity to the said means through said conductors.

6. An indicating device comprising a screen, a source of light, a solenoid, a plunger for said solenoid, and a shutter operated by said plunger, interposed between the source of light and the screen to control the passage of light from said light source to said screen, a source of electricity, conductors, a switch, and a switchboard controlled thereby for supplying electricity to the said solenoid through said conductors.

7. An indicating device comprising a screen, a source of light, a plurality of solenoids, a hollow plunger for each solenoid, a shutter operated by each plunger, and a lens in each plunger, interposed between the source of light and the screen to control the passage of light from said light source to said screen, a source of electricity, conductors, a switch, and a switchboard controlled thereby for supplying electricity to the said solenoids through said conductors.

8. An indicating device comprising a screen, a source of light, a solenoid, a plunger for said solenoid, and a shutter operated by said plunger, interposed between the source of light and the screen to control the passage of light from said light source to said screen, a source of electricity, conductors, a switch, and two alternative switchboards interchangeably controlled thereby for supplying electricity to the said solenoid through said conductors.

9. An indicating device comprising a translucid screen, a source of light, a plurality of solenoids, a plunger for each solenoid, and a shutter operated by said plunger, interposed between the source of light and the screen to control the passage of light from said light source to said screen, and light-excluding means enclosing said solenoids and light source, said means being mounted for horizontal movement back of said screen.

10. An indicating device comprising a translucid screen, a source of light, a plurality of solenoids, a plunger for each solenoid, and a shutter operated by said plunger, interposed between the source of light and the screen to control the passage of light from said light source to said screen, and light-excluding means enclosing said solenoids and light source, said means being mounted for vertical movement back of said screen.

11. An indicating device comprising a translucid screen, a source of light, a plurality of solenoids, a plunger for each solenoid, and a shutter operated by said plunger, interposed between the source of light and the screen to control the passage of light from said light source to said screen, and light-excluding means enclosing said solenoids and light source, said means being mounted for both horizontal and vertical movement back of said screen.

12. An indicating device comprising a translucid screen, a source of light, a plurality of solenoids, a plunger for each solenoid, and a shutter operated by said plunger, interposed between the source of light and the screen to control the passage of light from said light source to said screen, light-excluding means enclosing said solenoids and light source, said means being mounted for horizontal movement back of said screen, and horizontally movable opaque screens carried thereby and covering the remaining portion of the translucid screen to protect it from extraneous light.

13. An indicating device comprising a translucid screen, a source of light, a plurality of solenoids, a plunger for each solenoid, and a shutter operated by said plunger, interposed between the source of light and the screen to control the passage of light from said light source to said screen, light-excluding means enclosing said solenoids and light source, said means being mounted for vertical movement back of said screen, and vertically movable opaque screens carried thereby and covering the remaining portion of the translucid screen to protect it from extraneous light.

14. An indicating device comprising a translucid screen, a source of light, a plurality of solenoids, a plunger for each solenoid, and a shutter operated by said plunger, interposed between the source of light and the screen to control the passage of light from said light source to said screen, light-excluding means enclosing said solenoids and light source, said means being mounted for both horizontal and vertical movement back of said screen, a pair of horizontally movable opaque screens and a pair of vertically movable opaque screens, all carried thereby and covering the remaining portion of the translucid screen to protect it from extraneous light.

15. An indicating device comprising a translucid screen, a source of light, a plurality of solenoids, a plunger for each solenoid, and a shutter operated by said plunger, interposed between the source of light and the screen to control the passage of light from said light source to said screen, light-excluding means enclosing said solenoids and light source, said means being mounted for both horizontal and vertical movement back of said screen, a pair of horizontally movable flexible opaque screens and a pair of vertically movable flexible opaque screens, all attached thereto at one end and covering the remaining portion of the translucid screen to protect it from extraneous light, and spring-actuated rollers carrying the outer ends of said opaque screens to wind up the unused portions thereof and thus keep them stretched flat.

16. An indicating device comprising a screen, a source of light, electrically actuable means interposed between the source of light and the screen to control the passage of light from said light source to said screen, a source of electricity, conductors, a switch, and a switchboard controlled thereby for supplying electricity to the said means through said conductors, said switch comprising two members, one of which has a series of relatively fixed contacts and the other of which is pivotally mounted with respect thereto and carries a plurality of arcuate contacts adapted to make connection with successive ones of said fixed contacts upon relative rotation of the two members.

17. An indicating device comprising a screen, a source of light, electrically actuable means interposed between the source of light and the screen to control the passage of light from said light source to said screen, a source of electricity, conductors, a switch, and a switchboard controlled thereby for supplying electricity to the said means through said conductors, said switch comprising two members, one of which has a series of relatively fixed contacts and the other of which is pivotally mounted with respect thereto and carries a plurality of arcuate contacts adapted to make connection with successive ones of said fixed contacts upon relative rotation of the two members, one of said members being provided with a plurality of holes, a pin fitting any of said holes, and an abutment on the other member to coact with said pin, to prevent further relative rotation when it engages the abutment.

18. An indicating device comprising a screen, a source of light, electrically actuable means interposed between the source of light and the screen to control the passage of light from said light source to said screen, a source of electricity, conductors, a switch, and a switchboard controlled thereby for supplying electricity to the said means through said conductors, said switch comprising two members, one of which has a series of relatively fixed contacts and the other of which is pivotally mounted with respect thereto and carries a plurality of arcuate contacts adapted to make connection with successive ones of said fixed contacts upon relative rotation of the two members, a second switch having a similar number of contacts, and conductors each connecting one of the last-named contacts to a corresponding one of the said arcuate contacts.

ANTHONY B. WHITE.